Inventors
Raymond A. Senkbeil
Charles H. Knickman
Attorneys

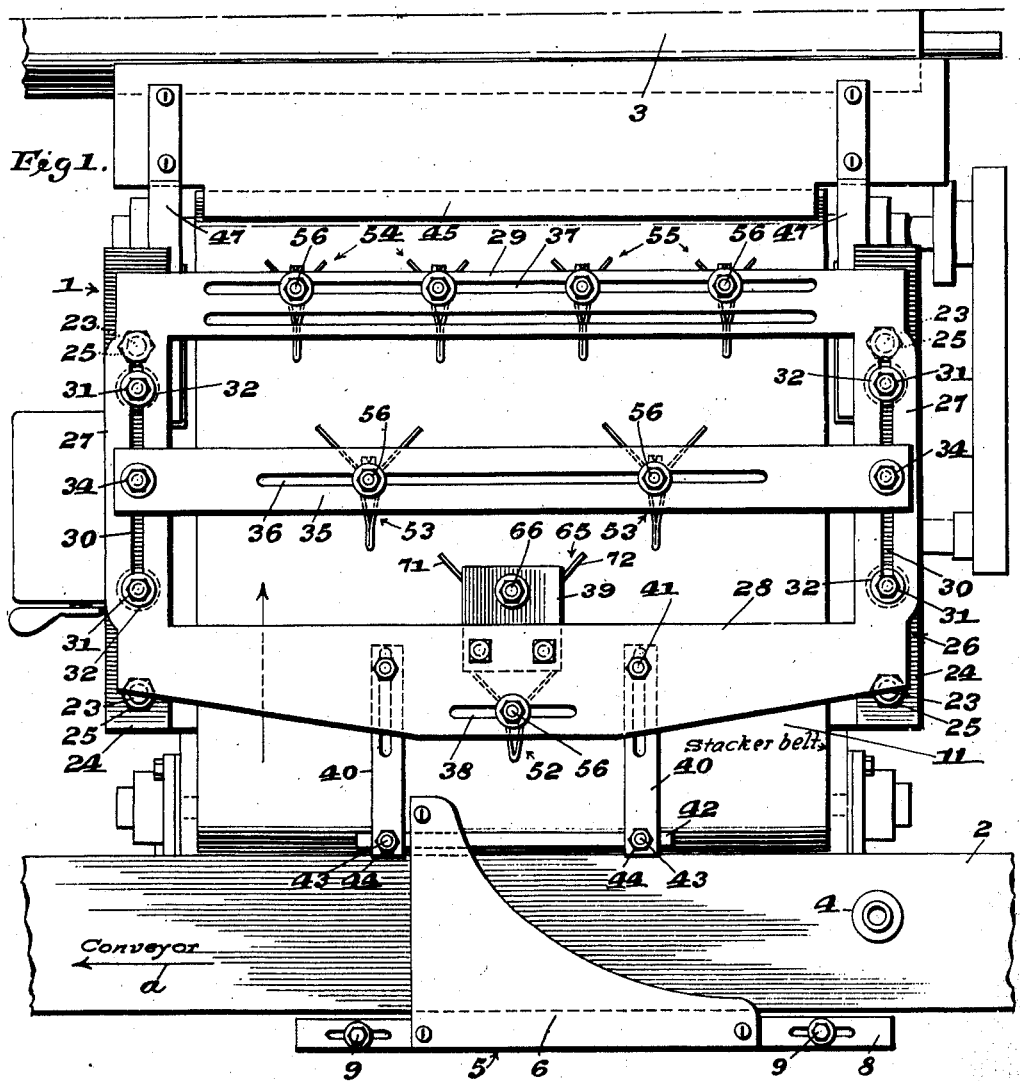

Patented Dec. 8, 1942

2,304,379

UNITED STATES PATENT OFFICE 2,304,379

GLASSWARE DISTRIBUTOR FOR LEHRS

Raymond A. Senkbeil, Baltimore, and Charles H. Knickman, Catonsville, Md., assignors to Maryland Glass Corporation, Baltimore, Md., a corporation of Maryland Application July 9, 1941, Serial No. 401,684

4 Claims. (Cl. 198—31)

This invention relates to improvements in distributing apparatus. The primary purpose for which the invention is intended is the distribution of glassware as delivered by a conveyor into a predetermined number of rows in a lehr so that the articles of glassware will be separated the requisite distances for insuring the proper annealing thereof. While this is the foremost purpose of the invention as stated, yet the principles thereof are easily and permissibly extensible to the separation of other articles into prearranged rows, the instant switches then working on the precise order disclosed herein.

Practice has demonstrated the desirability of shortening the space between the delivery conveyor belt and the lehr belt as much as possible, thereby enabling a condensation, so to speak, of the apparatus which, although relatively minor in nature yet offers an advantage from the standpoint of conservation of floor space. Practice has further demonstrated the desirability of definitely limiting the swinging of the switches so that the successively impinging articles will be invariably directed to the specific row positions intended for them. A still further need which has developed from practical experience is that of a framework which is not only adjustable in its various parts but also of such a nature that it can be taken apart readily for repairing, replacement and modification. With these preliminary statements in mind the objects of the invention are readily understood, said objects being as follows:

First, to provide a distributor wherein a stationary switch is interposed between a single movable leader switch and a succeeding pair of movable switches, said stationary switch serving to immediately divert the articles of glassware to said succeeding pair which, to carry out the purpose of condensation of space, in turn supply individual pairs of movable switches.

Second, to interpose the improved distributor between the right-angularly related lehr and conveyor delivery belts, said distributor including a conveyor belt which is supplied with bridge plates at its entrance and exit to smoothly and easily carry the articles of glassware across the gaps between the various belts.

Third, to provide a framework in which the various switches are suspended, said framework being composed of universally adjustable parts, that is to say, composed of parts which are adjustable in every necessary direction so as to station the switches precisely in the working positions desired.

Fourth, to provide a framework composed of an assemblage of interconnected parts which, because of being separate, are capable of ready replacement in the event of a breakage or in case it is desired to modify the shape of some one particular part.

Fifth, to provide a distributor in which the movable switch has a novel mounting in that the plate which carries the movable switch not only provides the rest on which the hub of the switch is journaled but also provides a finger adapted to act as a stop for the wings of the switch so as to insure that the switch will take alternately identical positions and thus never vary in directing the articles into the desired row positions.

Other objects and advantages will appear in the following specification, reference being had to the accompanying drawings in which:

Figure 1 is a plan view of the improved distributor, illustrating its relationship to the delivery conveyor belt and to the annealing belt of the lehr.

Figure 2 is a perspective view of one of the movable switches.

Figure 3 is a detail perspective view of the combined rest plate and stop finger.

Figure 4:
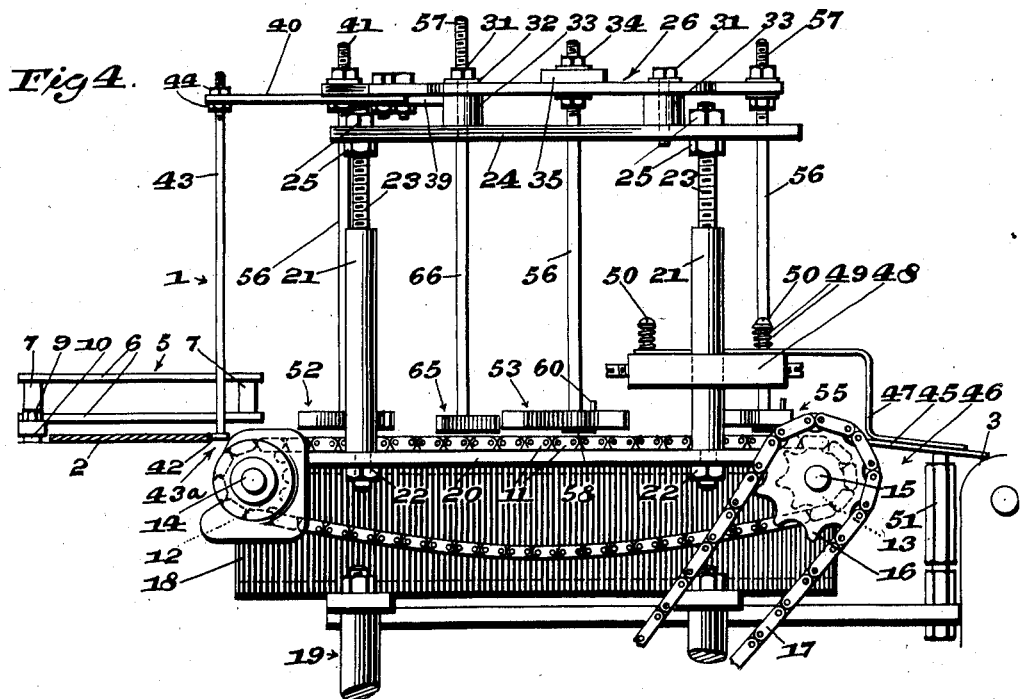
Figure 4 is a side elevation of the structure shown in Fig. 1, the delivery conveyor belt being shown in section.

In carrying out the invention the distributor 1 (Fig. 1) is located between the delivery conveyor belt 2 and the annealing belt 3 of a lehr. The details of the lehr are omitted because they are not essential to an understanding of the invention, it being believed sufficient to state that the lehr generally comprises a tunnel in which muffled heat is maintained at a sufficiently high temperature to insure the proper annealing of newly molded glassware.

Said glassware obviously may be of virtually any description, the instant article 4 (Fig. 1) being regarded as a small bottle which moves along the belt 2 (arrow a, Fig. 1) from the molding machine. All of the belts involved herein are constructed of heat resistant material. Much of the details thereof are omitted to simplify the illustration. Situated at an appropriate place over the belt 2 is a deflector 5. This deflector is composed of a pair of identical plates 6 (Fig. 4) held apart by spacers 7. The assembled plates are connected to a bar 8 (Fig. 1) which is adjustably attached at 9 to an appropriate support 10 (Fig. 4) at the outer edge of the conveyor 2. From there the deflector 5 extends across the belt 2 so as to deflect the article 4 from its movement in the direction of arrow *a* to a direction of movement at right angles as denoted by the arrows *c* (Fig. 5).

The distributor 1 comprises a belt 11 which, for the purpose of convenient distinction from the others, is hereinafter identified as the stacker belt. It is carried by sprocket rollers 12, 13 or their suitable equivalents. The shafts 14, 15, of these rollers are journaled in appropriate bearings, one of said shafts, preferably the shaft 15, being equipped with a sprocket 16, for a chain drive 17 which leads off to the speed reducer of a driving motor. Neither of these elements is shown, it being sufficient to state that the stacker belt 11 is driven at a low rate so as to properly feed the lehr at a speed not above the rate determined by practice to be preferable.

The framework of the distributor 1 can be considered as beginning at channel irons such as 18 (Fig. 4) of which there is one on each side of the machine. These channel irons are affixed on top of standards generally designated 19. Said channels are topped by a foundation plate 20 across which the upper run of the stacker belt 11 is dragged. Since the plate 20 is held perfectly level it follows that the top run of the stacker belt remains perfectly level, so that none of the articles 4 is ever upset or at least rarely so.

Uprights 21 (Fig. 4) are secured at 22 to the foundation plate 20. Each of these uprights terminates in a threaded stem 23 which extends up through a side plate 24. The connection of the threaded stems is made by means of a pair of nuts 25 one above and the other below the side plate 24. There are two of said side plates (Fig. 1) and the points of connection of the uprights 21 occur near the extremities of the respective plates, from which it will be understood that there are two of the uprights 21 on each side of the distributor. The setting of the position of the side plates 24 in respect to the top run of the stacker belt 11 is accomplished by means of the nuts 25, subsequent adjustments of the switches being obtained in respect to the side plates 24 without necessarily resetting said side plates.

Figure 5:
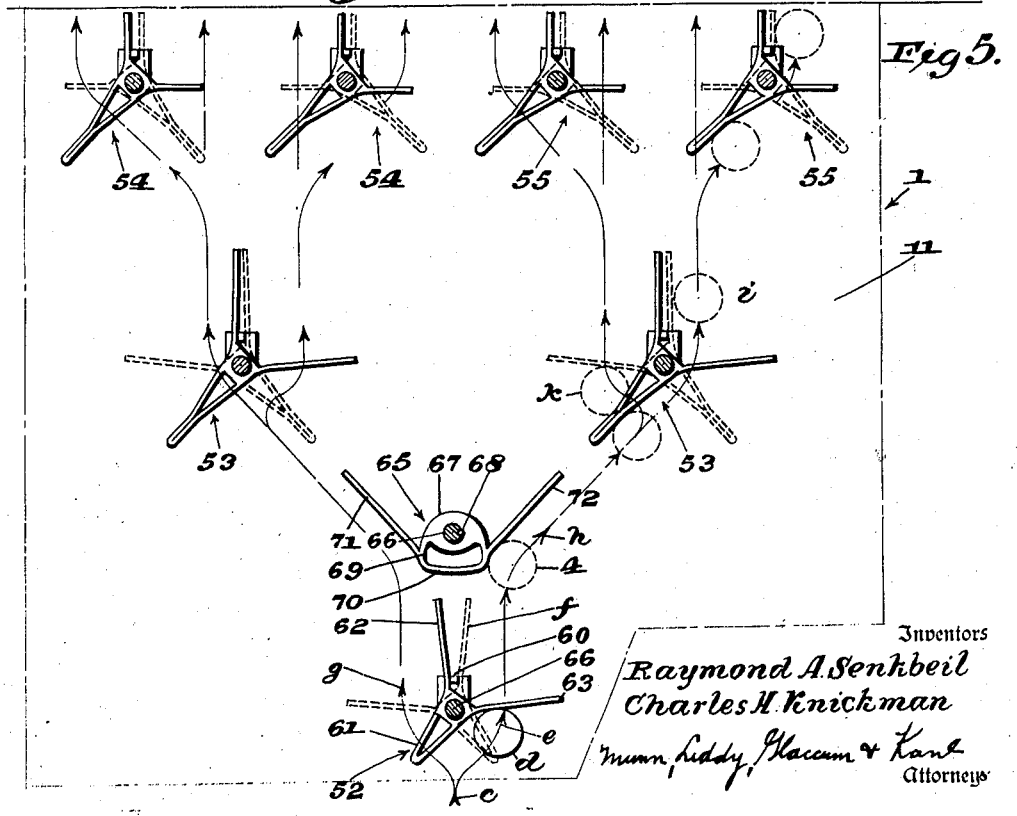
Figure 5 is a diagrammatic plan view of the switch arrangement of the distributor, particularly illustrating the automatic distributing action.

Surmounting the side plates 24 is a frame 26 (Fig. 4). This is a centrally open frame of generally rectangular configuration (Fig. 1). It comprises side portions 27 and front and rear portions 28, 29. The side portions 27 are slotted at 30 for the occupancy of bolts 31 which are inserted through washers 32 on top of the side portions 27 and through spacers 33 between said side portions 27 and the side plates 24 before being driven into the side plates as shown in Fig. 4.

The same slots 30 carry the securing bolts 34 by which a center bar 35 is affixed at its ends to the side portions 27. Said center bar is adjustable lengthwise of the side portions 27 so as to station its carried switches in the desired relationship to the other switches of the set. Said center bar has a longitudinal slot 36 to which further reference will be made. There is at least one longitudinal slot 37 in the rear portion 29. The front portion 28 also contains a slot 38.

Said portion 28 is somewhat wider than the others. In addition to containing the slot 38 it carries a supporting plate 39 from which the stationary switch is pendent. A pair of arms 40 extend forwardly from the front portion 28 (Fig. 1), being attached to said portion by bolt and slot connections generally denoted 41. Said connections provide for the adjustment of a bridge plate 42 (Fig. 1) in respect to the gap 43*a* (Fig. 4) between the conveyor and stacker belts 2, 11. The suspension of the bridge plate 42 is made by a pair of rods 43 which are secured to the extremities of the arms 40 in any desired way, preferably by nuts 44 which are screwed onto threaded ends of the rods so that up and down adjustment may be had.

A generally similar bridge plate 45 covers the gap 46 between the stacker and annealing belts 11, 3. The bridge plate 45 is necessarily wider in the longitudinal direction of article movement and longer crosswise of the distributor than the bridge plate 42 because the gap 46 is much wider than the gap 43*a* and instead of accommodating only single articles the bridge plate 45 accommodates eight rows of distributed articles. The bridge plate 45 is suspended by brackets 47 which are attached at one end to the bridge plate and at the other end are yieldably held down upon mounts 48 by springs 49 encircling the adjustable screws 50. The mounts 48 are secured to chosen ones of the uprights 21. The bridge plate 45 is adjustable by the means 51 (Fig. 4), and when an adjustment is made there is a yielding of the springs 49 so as to allow the bridge plate to assume the desired position.

The system of switches is well illustrated in Figs. 1 and 5. The leader switch 52 is movable as are also the two succeeding switches 53, and the individual pairs of switches 54, 55. Each one of the movable switches has a supporting rod 56, threaded at the top as at 57 and provided at the bottom with a plate 58 (Fig. 3). This plate provides a rest for the hub 59 of the respective switch (Fig. 2). Said hub is turnable on the rest plate, the turning of the switch being perfectly free. Said rest plate also has an upstanding finger 60 which provides a stop for the respective switch.

Each switch has an arm 61 which is directed from the hub 59 oppositely to a pair of wings 62, 63, with respect to which said arm 61 is centered. The finger 60 occupies part of the space between the wings and serves to stop the switch at the end of each of its two movements by contact of one or the other of the wings. The arm 61 of each of the switches has an open loop. However, the arms 61 of switches 53, 54, and 55 have their loops partially closed, as shown at 64, Fig. 2.

The stationary switch, now designated 65, is firmly secured at the bottom end of a supporting rod individually designated 66. Like the other switches the stationary switch 65 has a hub 67. It is this hub which is secured to the rod 66 and the securing may be done by screw threads or by means of a key 68 (Fig. 5). The hub 67 has a forwardly directed body 69 which is rounded at 70 on its forward face so as to aid in deflecting the articles 4 to one or the other of the pair of wings 71, 72. With this description in mind reference is next directed to the operation.

The article 4 (Fig. 1) advances in the direction of the arrow *a* and is gradually displaced from the belt 2 by contact with the deflector 5 which extends over the bridge plate 42 and the stacker belt 11. Since the bridge plate is relatively narrow as compared with the diameter of the bottles 4 said bottles will be forced over the plate sufficiently so that the bottoms of the bottles will come into engagement with the moving stacker belt and the bottles will then be carried along the belt. The article enters the distributor 1 in the direction of arrow c (Fig. 5) and is carried forwardly by the belt 11 into engagement with the switch 52. The leader switch 52 is assumed to be in the full line position. In engaging the arm 61 the article can move only to the right (position d, Fig. 5) because of the finger 60 stopping the switch against clockwise movement which, if permitted, might lead the article off to the left. As said article bears against the wing 63 (arrow e, Fig. 5) the switch 52 is turned counterclockwise to the dotted line position f. The turning continues until the finger 60 stops the wing 63, thus placing the switch 52 in position to shunt the next article off to the left (arrow g).

Upon encountering the stationary switch 65 the article 4 is shunted off to the right (arrow h, Fig. 5). When the right hand switch 53 of the succeeding pair is encountered there is a repetition of the action at the leading switch 52. Succeeding articles 4 are shunted first to the right and then to the left of the switch (see i and k), and the same action is repeated for the alternately shunted articles when they reach the individual pairs of switches 54, 55.

The action is readily understood without repeating the description for each of the switches. The importance of the stop finger 60 resides in the positive limitation of each movable switch. The forwardly directed arm 61 will assume the same angular relationship to each side of the center line at each alternate operation. This insures the uniform distribution of the articles as they are introduced into the distributor 1. The stationary switch 65 has been found to be of advantage in practice because of the effectiveness with which the articles are diverted by it to the respective sides of the longitudinal center of the stacker belt 11.

It is readily seen in Fig. 1 that the entire assemblage of switches is capable of removal from the distributor by taking off the frame 26. The bridge plate 42 also goes with this frame thereby leaving the stacker belt clear in its virtual entirety for such access thereto as may be needed. In practice it becomes necessary at times to change the setting of the switches. This can be accomplished in every desired way, both laterally, up and down and in the front to rear directions.

We claim:

1. Apparatus of the character described comprising an article delivery conveyor belt movable in one direction, an annealing belt movable at right angles to the delivery belt, and a deflector to shunt articles off of the delivery belt, a distributor for said articles consisting of a stacker belt having a run movable from the delivery belt to the annealing belt, a plurality of switches operable above said run to divert succeeding articles into laterally separated lanes along the annealing belt, bridge plates providing gap closures between the various belts, and a frame from which all of the switches and the bridge plates are commonly suspended.

2. Apparatus of the character described comprising an article delivery conveyor belt movable in one direction, an annealing belt movable at right angles to the delivery belt, and a deflector to shunt articles off of the delivery belt, a distributor for said articles consisting of a stacker belt having a run movable from the delivery belt to the annealing belt, a foundation plate across which said run is movable to keep the run level, uprights on the foundation plate, side plates affixed to said uprights, a plurality of switches operable above said run to divert succeeding articles into laterally separated lanes along the annealing belt, rods by which the switches are carried, a frame from which the rods are commonly suspended, and means attaching the frame to the side plates.

3. Apparatus of the character described comprising an article delivery conveyor belt movable in one direction, an annealing belt movable at right angles to the delivery belt, a deflector to shunt articles off of the delivery belt, a distributor for said articles consisting of a stacker belt having a run movable from the delivery belt to the annealing belt, a foundation plate across which said run is movable to keep the run level, uprights on the foundation plate, side plates affixed to said uprights, a plurality of switches operable above said run to divert succeeding articles into laterally separated lanes along the annealing belt, bridge plates in gap closing positions between the various belts, rods by which the respective switches and bridge plates are carried, arms from which the bridge plate rods are suspended, and a frame attached to the side plates, constituting the common mount for said arms and all of said rods, thereby providing a unitary structure which upon removal from the side plates makes the stacker belt easily accessible.

4. Apparatus of the character described comprising an article delivery conveyor belt movable in one direction, an annealing belt movable at right angles to the delivery belt, a distributor for said articles consisting of a stacker belt having a run movable from the delivery belt to the annealing belt, a deflector extending over the delivery belt and over the contiguous portion of the stacker belt for shunting articles off the delivery belt onto the stacker belt, a plurality of switches operable above said run to divert succeeding articles into laterally separated lanes along the annealing belt, a restricted means bridging the space between the delivery belt and the stacker belt and of less width than the articles conveyed so that the deflector will force the articles from the delivery belt across the bridging means onto the stacker belt, the deflector extending across the bridging means, and a frame from which all of the switches and the bridging means are commonly suspended.

RAYMOND A. SENKBEIL.
CHARLES H. KNICKMAN.